United States Patent
Crum

(10) Patent No.: US 10,807,576 B2
(45) Date of Patent: Oct. 20, 2020

(54) BRAKE ACTUATOR-BASED PROGNOSTIC SYSTEM AND METHOD THEREOF

(71) Applicant: Allison Transmission, Inc., Indianapolis, IN (US)

(72) Inventor: Bruce E. Crum, Brownsburg, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 78 days.

(21) Appl. No.: 15/730,844

(22) Filed: Oct. 12, 2017

(65) Prior Publication Data

US 2018/0126966 A1 May 10, 2018

Related U.S. Application Data

(60) Provisional application No. 62/419,506, filed on Nov. 9, 2016.

(51) Int. Cl.
*B60T 8/175* (2006.01)
*B60T 7/08* (2006.01)
(Continued)

(52) U.S. Cl.
CPC .............. *B60T 8/175* (2013.01); *B60T 7/042* (2013.01); *B60T 7/085* (2013.01); *B60T 13/662* (2013.01);
(Continued)

(58) Field of Classification Search
CPC .......... B60T 13/66; B60T 8/175; B60T 7/085; B60T 7/042; B60T 13/662; B60T 13/745;
(Continued)

(56) References Cited

U.S. PATENT DOCUMENTS

| 4,309,917 A | 1/1982 | Leet |
| 4,995,483 A | 2/1991 | Moseley et al. |

(Continued)

FOREIGN PATENT DOCUMENTS

EP 0153266 A1 8/1985

OTHER PUBLICATIONS

European Patent Office; European Search Report and Opinion; dated Apr. 18, 2018; pp. 1-6.

*Primary Examiner* — Bradley T King
*Assistant Examiner* — Mahbubur Rashid
(74) *Attorney, Agent, or Firm* — Taft Stettinius & Hollister LLP; Stephen F. Rost

(57) ABSTRACT

A method of controlling brake clearance of a braking system of a vehicle includes providing a brake actuator, a brake input device, and a cross-drive transmission having an output and a brake pack. The method includes receiving a brake input request from the brake input device, actuating the brake actuator to apply the brake pack, and moving the brake actuator from a first position to a second position during the actuating step. The method also includes detecting an axial movement of the actuator from the first position to the second position, comparing the axial movement to a clearance threshold, and adjusting a return position of the brake actuator that is offset from the first position when the axial movement exceeds the clearance threshold. The method further includes controlling movement of the brake actuator from the second position to the return position.

17 Claims, 9 Drawing Sheets

(51) Int. Cl.
*B60T 17/22* (2006.01)
*F16D 65/72* (2006.01)
*B60T 13/66* (2006.01)
*B60T 13/74* (2006.01)
*F16D 66/02* (2006.01)
*B60T 7/04* (2006.01)
*F16H 61/28* (2006.01)

(52) U.S. Cl.
CPC ............ *B60T 13/74* (2013.01); *B60T 13/745* (2013.01); *B60T 17/22* (2013.01); *F16D 65/72* (2013.01); *F16D 66/021* (2013.01); *F16H 2061/283* (2013.01)

(58) Field of Classification Search
CPC ...... B60T 17/221; B60K 6/445; B60W 10/18; F16D 765/72; F16D 765/021; F16D 765/283
See application file for complete search history.

(56) References Cited

U.S. PATENT DOCUMENTS

| | | | | |
|---|---|---|---|---|
| 5,646,849 A * | 7/1997 | Walenty | ............... | B60T 8/1764 303/155 |
| 5,823,912 A * | 10/1998 | Fischer | ............... | F16D 25/123 477/97 |
| 6,003,640 A * | 12/1999 | Ralea | ............... | B60T 8/1703 188/1.11 L |
| 6,238,011 B1 * | 5/2001 | Heckmann | ............ | B60T 8/3255 188/71.7 |
| 6,250,436 B1 * | 6/2001 | Oikawa | ............... | B60T 1/065 188/1.11 E |
| 6,305,506 B1 * | 10/2001 | Shirai | ............... | B60T 7/042 188/136 |
| 6,522,967 B1 * | 2/2003 | Pfeil | ............... | B60T 7/108 188/171 |
| 6,554,108 B1 * | 4/2003 | Bohm | ............... | B60T 17/221 188/1.11 E |
| 8,997,947 B2 * | 4/2015 | Shiraki | ............... | F16D 65/66 188/156 |
| 9,227,617 B2 * | 1/2016 | Cahill | ............... | B64C 25/42 |
| 9,610,927 B2 * | 4/2017 | Ayichew | ............... | B60T 8/171 |
| 2001/0030462 A1 * | 10/2001 | Disser | ............... | B60T 7/042 303/20 |
| 2005/0029858 A1 * | 2/2005 | Forster | ............... | F16D 65/18 303/20 |
| 2005/0035653 A1 * | 2/2005 | Godlewsky | ............... | B60T 8/00 303/122.03 |
| 2005/0082999 A1 * | 4/2005 | Ether | ............... | B60T 8/1703 318/362 |
| 2005/0269872 A1 * | 12/2005 | Ralea | ............... | B60T 8/00 303/20 |
| 2007/0068237 A1 * | 3/2007 | Zumberge | ............ | B60T 13/741 73/121 |
| 2007/0235267 A1 * | 10/2007 | Liebert | ............... | B60T 7/108 188/1.11 L |
| 2007/0240947 A1 * | 10/2007 | Goss | ............... | B60T 7/042 188/158 |
| 2007/0282511 A1 * | 12/2007 | Henry | ............... | G05B 19/19 701/70 |
| 2008/0283346 A1 * | 11/2008 | Ralea | ............... | B60T 8/00 188/156 |
| 2009/0084637 A1 * | 4/2009 | Bailey | ............... | F16D 66/021 188/1.11 E |
| 2009/0114488 A1 * | 5/2009 | Bailey | ............... | B60T 13/74 188/1.11 E |
| 2011/0018337 A1 * | 1/2011 | King | ............... | B60T 8/1703 303/13 |
| 2011/0074209 A1 * | 3/2011 | Ueno | ............... | B60T 13/745 303/20 |
| 2013/0175403 A1 * | 7/2013 | Spray | ............... | B60T 8/1703 244/235 |
| 2016/0041058 A1 * | 2/2016 | Georgin | ............... | B60T 8/1764 303/155 |

* cited by examiner

BRAKE ACTUATOR-BASED PROGNOSTIC SYSTEM AND METHOD THEREOF

RELATED APPLICATIONS

This application claims the benefit of U.S. Provisional Application Ser. No. 62/419,506, filed Nov. 9, 2016, the disclosure of which is hereby expressly incorporated by reference in its entirety.

FIELD OF THE DISCLOSURE

The present disclosure relates to a method of controlling a transmission system, and in particular to a method of controlling a brake actuator based prognostic system to adjust brake pack clearance and identify wear limits of a brake pack.

BACKGROUND

In a conventional vehicle or work machine, a transmission system transfers torque from an engine or prime mover to a ground-engaging mechanism such as a wheel or track. In a tracked vehicle, for example, a transmission may transfer torque to the tracks to allow the vehicle or machine to move in a forward or reverse direction. The vehicle may include independent braking and steering systems that affect vehicle performance. The braking system may include one or more brake plates that form a pack. System performance and efficiency may be controlled by maintaining appropriate clearance between adjacent plates in the pack, and identifying possible wear of the brake plates during or after operation.

SUMMARY

In one embodiment of the present disclosure, a method of controlling brake clearance of a braking system of a vehicle includes providing a brake actuator, a brake input device, and a cross-drive transmission including an output and a brake pack; receiving a brake input request from the brake input device to execute a braking operation; actuating the brake actuator to apply the brake pack for reducing a speed of the output; controllably moving the brake actuator from a first position to a second position during the actuating step, where the first position corresponds to an unapply position and the second position corresponds to an apply position; detecting an axial movement of the actuator from the first position to the second position during the controllably moving step; comparing the axial movement to a clearance threshold; adjusting a return position of the brake actuator that is offset from the first position when the axial movement exceeds the clearance threshold; and controlling movement of the brake actuator from the second position to the return position.

In one example of this disclosure, the detecting step includes determining a number of revolutions of rotation of the brake actuator when moving from the first position to the second position. In a second example, the method may include sending current to the brake actuator to control its movement from the first position to the second position. In a third example, the method may include sending a first amount of current to the brake actuator to control its movement from the first position to the second position, and sending a second amount of current to the brake actuator to control its movement from the second position to the return position, where the first amount is different from the second amount.

In a fourth example, the method may include controllably moving the brake actuator from the second position to the first position if the axial movement does not exceed the clearance threshold. In a fifth example, the method may include providing a sensor for detecting movement of the brake actuator relative to its first position; and determining an amount of clearance in the brake pack based on the detecting step. In a sixth example, the method may include detecting an amount of pressure applied by the brake actuator to the brake pack in the second position; comparing the amount of pressure to a pressure threshold; and adjusting an amount of current sent to the brake actuator when it moves to the second position based on the comparing step.

In another example, the adjusting an amount of current step may include increasing the amount of current when the amount of pressure is less than the pressure threshold. In a further example, the method may include modulating an amount of current sent to the brake actuator to control an amount of force applied by the brake actuator against the brake pack in the second position. In yet a further example, the method may include sensing an amount of force applied to the brake input device; determining an amount of current based on the sensing step; and sending the amount of current to the brake actuator during execution of the braking operation.

In another embodiment of the present disclosure, a method of controlling brake clearance of a brake pack of a vehicle includes providing a first brake actuator, a second brake actuator, a brake input device, and a cross-drive transmission including a first output and a second output; receiving a brake input request from the brake input device; applying the first brake actuator to the first output and the second brake actuator to the second output, where the first brake actuator is moved from its start position to a first apply position, and the second actuator is moved from its start position to a second apply position; detecting a first axial movement of the first actuator during the applying step; detecting a second axial movement of the second actuator during the applying step; comparing the first axial movement to a first clearance threshold and the second axial movement to a second clearance threshold; adjusting the position of the first brake actuator and the second brake actuator relative to their respective start position based on a result of the comparing step; and controlling brake clearance of the first output and the second output.

In one example of this embodiment, the detecting steps include determining a number of revolutions of rotation of the first and second brake actuators. In a second example, the method may include sending current to the first and second brake actuators to control their axial movement. In a third example, the method may include sending a first amount of current to either the first or second brake actuator to control its axial movement from a first position to a second position, and sending a second amount of current to the first or second brake actuator to control its movement from the second position to a return position, where the first amount is different from the second amount. In a fourth example, the method may include controllably moving either the first or the second brake actuator from the second position to the first position if the respective axial movement does not exceed the respective clearance threshold.

In another example of this embodiment, the method may include detecting an amount of pressure applied by the first or second brake actuator to the respective first or second output in the second position; comparing the amount of pressure to a pressure threshold; and adjusting an amount of current sent to the first or the second brake actuator when it moves to the second position based on the comparing step. In a further example, the method may include modulating an amount of current sent to the first brake actuator to control an amount of force applied by the first brake actuator against the first output; and modulating an amount of current sent to the second brake actuator to control an amount of force applied by the second brake actuator against the second output.

In a further embodiment of the present disclosure, a method of detecting brake wear includes providing a first brake actuator, a second brake actuator, a brake input device, and a cross-drive transmission including a first output having a first brake pack and a second output having a second brake pack; receiving a brake input request from the brake input device; controlling the first brake actuator to apply the first brake pack and the second brake actuator to apply the second brake pack, where the first brake actuator is axially controlled from its start position to a first apply position, and the second brake actuator is moved from its start position to a second apply position; detecting a first axial movement of the first brake actuator during the controlling step; detecting a second axial movement of the second brake actuator during the controlling step; comparing the first axial movement to a first wear threshold and the second axial movement to a second wear threshold; and sending an alert if the first axial movement exceeds the first wear threshold or the second axial movement exceeds the second wear threshold.

In one example of this embodiment, the detecting steps may include determining a number of revolutions of rotation of the first and the second brake actuators. In a second example, the method may include sensing an amount of force applied by the first brake actuator to the first brake pack and an amount of force applied by the second brake actuator to the second brake pack; determining if the first brake actuator maintains substantially the same amount of force applied to the first brake pack and if the second brake actuator maintains substantially the same amount of force applied to the second brake pack; and executing the sending step if the first actuator is unable to maintain substantially the same amount of force applied to the first brake pack or if the second actuator is unable to maintain substantially the same amount of force applied to the second brake pack.

In another example, the method may include diagnosing the first brake pack needs replaced when the first axial movement exceeds the first wear threshold; and diagnosing the second brake pack needs replaced when the second axial movement exceeds the second wear threshold. In a further example, the first wear threshold and the second wear threshold are the same. In yet a further example, the method may include executing an initialization routine to determine a position of the first and second brake actuators. In a related example, the sending step may include communicating an audible or visual alert indicative of excessive brake wear.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The terminology used herein is for the purpose of describing particular illustrative embodiments only and is not intended to be limiting. As used herein, the singular forms "a", "an" and "the" may be intended to include the plural forms as well, unless the context clearly indicates otherwise. Similarly, plural forms may have been used to describe particular illustrative embodiments when singular forms would be applicable as well. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Figure 1:
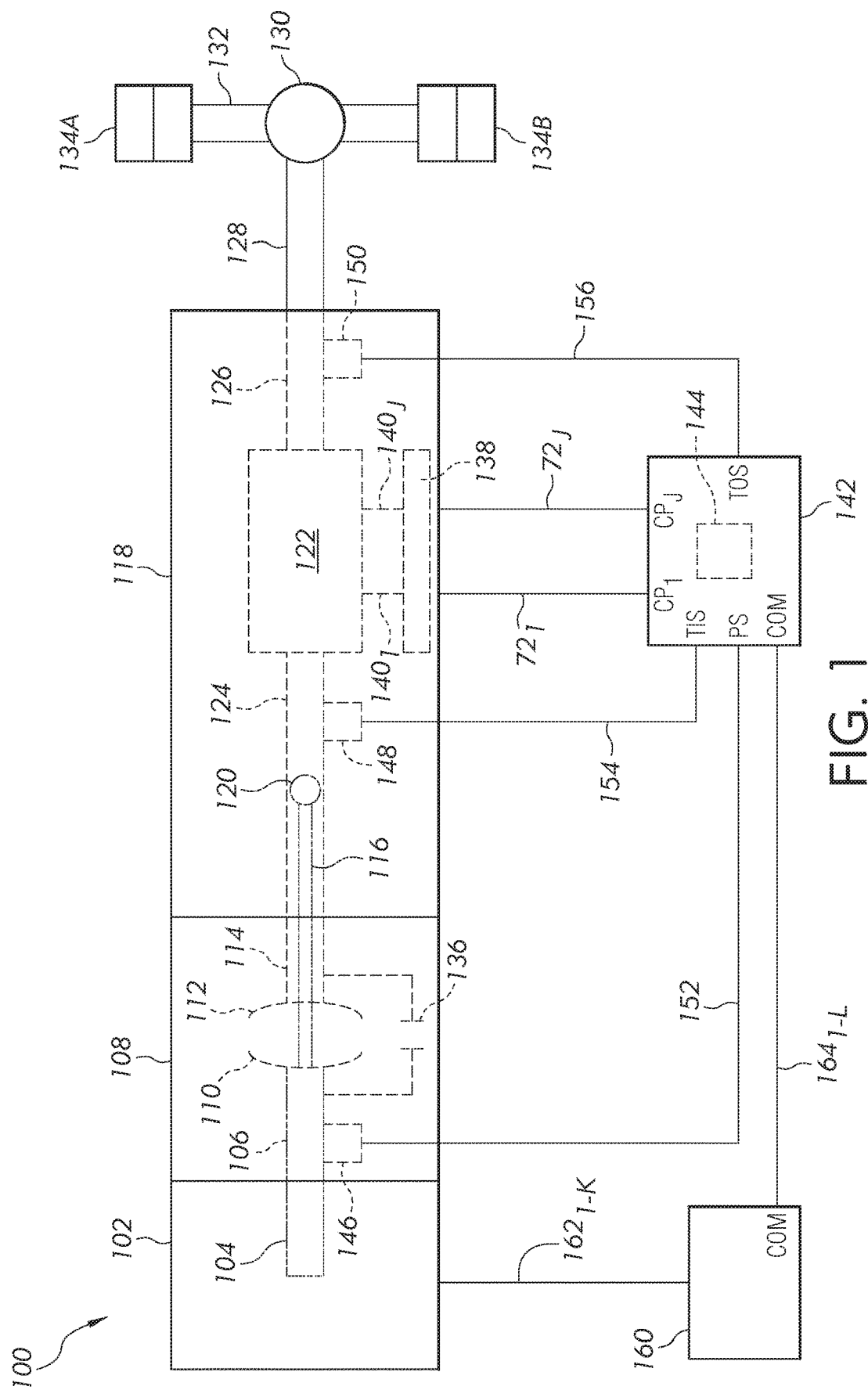
FIG. 1 is a block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when torque multiplication is not needed. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the pump shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump 120 which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a Society of Automotive Engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Referring to FIG. 2, one embodiment of a transmission system 200 is illustrated. The transmission system 200 includes an input 202 and an output 284. Torque may be provided at the input 202 by an engine (not shown), prime mover, or other torque-producing system. In this embodiment, the transmission system 200 includes a first side 286 and a second side 288. As shown, there is an output 284 at each side. The output 284 represents the transmission output in this embodiment. Output torque from the transmission output 284 may be delivered to a final drive assembly or other system to drive a ground-engaging mechanism such as a wheel or track.

The transmission system 200 may include an input shaft 204 which receives torque from the engine (not shown). A speed sensor 206 may be provided to detect or measure input speed based on the rotation of the input shaft 204. Alternatively, input speed (or engine speed) may be communicated to a transmission controller 310 (FIG. 3) via a J-1939 communication link or any other known means. Input speed and other characteristics, such as input torque, may be communicated to the transmission controller 310 from an engine controller 302 according to known methods.

The transmission system 200 may include a fluid coupling device such as a torque converter 208. The torque converter 208 may include a pump and a turbine. Moreover, a lockup clutch 210 may be provided as will be described in further detail.

Torque passing through the torque converter 208 drives a turbine shaft 212, as shown. The turbine shaft 212 is coupled between the torque converter 208 and a bevel gearset 214. The bevel gearset 214 may include a drive gear 216, a first driven gear 218 and a second driven gear 220. The drive gear 216 may be directly connected to the turbine shaft 212, and each driven gear may be coupled to a directional clutch.

In FIG. 2, the transmission system 200 includes a first directional clutch 226 and a second directional clutch 228. The first directional clutch 226 may be selectively engaged to allow the transmission output 284 to rotate in a forward direction or a reverse direction. The second directional clutch 228 may be selectively engaged to allow the transmission output 284 to rotate in a direction opposite of when the first directional clutch 226 is selectively engaged. Moreover, the directional clutches allow range clutch packs and a hydrostatic steer unit (HSU) 240 to be driven in either direction. Other directional clutches may be provided besides the ones depicted in FIG. 2. Moreover, if the transmission system is in a neutral position or range, one of the directional clutches may be selectively engaged. In other words, in one example, at least one of the directional clutches may be engaged in each selected position or range. In another example, however, there may be at least one position or range whereby neither or none of the directional clutches are selectively engaged.

For purposes of this disclosure, a selected position or range may include any gear ratio, speed ratio, position on a shift selector, or combination thereof. A shift selector may include a park position, a reverse position, a forward position, a neutral position, and a pivot position. The forward position may include a "low" and a "high" position. This may vary depending upon the type of vehicle or machine and its intended use. A four-wheel drive vehicle, for example, may include a "four-wheel drive" position and a "two-wheel drive" position. Thus, this disclosure is not intended to be limiting as it relates to any known type of position on a shift selector or range or ratio attainable by a transmission.

A first shaft 222 may be coupled between the first driven gear 218 and the first directional clutch 226. A second shaft 224 may be coupled between the second driven gear 220 and the second directional clutch 228. In other embodiments, a hub or gear may directly couple each driven gear to the directional clutch. The transmission controller 310 may selectively control the engagement or disengagement of the directional clutches. Other control means, such as the shift selector 304, for selectively engaging or disengaging the directional clutch is also possible. In any event, when the first directional clutch 226 is engaged, torque may transfer from the drive gear 216 to the first directional clutch 226 via the first driven gear 218 and the first shaft 222.

The output of each directional clutch is coupled to a range input gearset 230. The range input gearset 230 may include one or more gears. In FIG. 2, the range input gearset 230 includes a first range gear 232, a second range gear 234, and a third range gear 236. The first range gear 232 may be directly coupled to the output of whichever directional clutch is engaged. Thus, torque passes through the engaged directional clutch to the first range gear 232, which is connected to the second range gear 234. The second range gear 234 is coupled to the third range gear 236, which is coupled to an input of the HSU 240. The input of the HSU 240 drives a pump 242, and the pump 242 drives a motor 244 which functions as an output of the HSU 240.

A hydrostatic steer unit disconnect mechanism 266 may be provided to disconnect the HSU 240 from being connected to the transmission output 284. In one embodiment, the HSU disconnect mechanism 266 is a clutch. In another embodiment, it may be a dog clutch, a mechanical diode, or any other type of selectively engageable device. The HSU disconnect mechanism 266 may normally be engaged so that the HSU 240 is connected to the transmission output 284. However, when the HSU disconnect mechanism 266 is selectively disengaged or de-energized, then the HSU 240 may be disconnected from the transmission output 284. When it is disconnected, the HSU 240 may still receive torque from the range input gearset 230, but the HSU 240 is unable to transfer any torque to the output 284.

A speed sensor 238 is also shown in FIG. 2. The speed sensor 238 can measure the rotational speed at a location downstream or after the directional clutches. Here, the speed sensor 238 can measure a rotational speed from the second range gear 234 so that both speed and direction are detectable. Thus, the speed sensor 238 may detect both rotational speed and direction in at least one embodiment. In this disclosure, the speed detected by the speed sensor 238 may be referred to as turbine speed.

The transmission system 200 may also include a direct drive pivot clutch 246. The direct drive pivot clutch 246 may be selectively engaged to allow the transmission system 200 to operate in a pivot mode. The direct drive pivot clutch 246 may normally be disengaged so that torque is transferred directly from the engaged directional clutch to the HSU 240. However, when the direct drive pivot clutch 246 is engaged, torque may transfer from the selectively engaged directional clutch through the direct drive pivot clutch 246 to a steer drive geartrain 254. The steer drive geartrain 254 may include the range input gearset 230, a first direct drive gear 250, a second direct drive gear 252, a steer transfer shaft 256, and a steer planetary gearset 258.

When the direct drive pivot clutch 246 is engaged, torque may pass from the selectively engaged directional clutch through the direct drive pivot clutch 246 to rotationally drive a direct drive shaft 248. The direct drive shaft 248 may be coupled to the first direct drive gear 250 and the second direct drive gear 252. The steer transfer shaft 256 may be coupled to the second direct drive gear 252 so that torque splits to the first side 286 and the second side 288 of the transmission system 200. When the direct drive pivot clutch 246 is disengaged, torque may be received from the HSU 240 and split via the steer transfer shaft 256 to both sides of the transmission system 200.

The steer planetary gearset 258 may include a sun gear 260, a carrier member or assembly 262, and a ring gear 264. As shown, the ring gear 264 may be connected to a housing of the transmission system 200 and thus is fixed from rotation. Input to the planetary gearset 258 is via the sun gear 260, and output is via the carrier member 262. The HSU 240 may be connected to the sun gear 260 under normal circumstances, and it is only disconnected when the HSU disconnect mechanism 266 is selectively controlled to its disengaged position or state. Thus, when the HSU disconnect mechanism 266 is engaged, torque may transfer from the HSU 240 into the steer planetary gearset 258 via the sun gear 260 and output via the carrier member 262. The carrier member 262 may be coupled to a steer gear 270, which in turn is coupled to the steer transfer shaft 256. Moreover, torque from the carrier member 262 may also be transferred to a second steer gear 268 which is coupled to an output planetary gearset 272.

When the HSU disconnect mechanism 266 is selectively controlled to its disengaged position, i.e., during a direct drive pivot or pivot lockup mode, torque is not transferred via the HSU 240. Instead, the direct drive pivot clutch 246 is engaged, as described above, and torque passes through the steer planetary gearset 258 via the carrier member 264. In other words, there is no torque passing to the sun gear 260. The carrier member 262 is coupled to a sun gear 274 of the output planetary gearset 272 via the second steer gear 268.

The output planetary gearset 272 may include the sun gear 274, a carrier assembly or member 276, and a ring gear 278. Here, the sun gear 274 is the steer input to the output planetary gearset 272, and the carrier member 276 is the output of the gearset. The ring gear 278 may be coupled to a shaft 282 which may be splined to another gear or gearset (not shown). The carrier member 276 may be held or fixed from rotation by a brake 280, as shown in FIG. 2B.

The ring gear 278 is coupled to a transmission output shaft 282. There may be one or more output shafts 282. In one example, the ring gear 278 on the first side 286 is coupled to one output shaft 282, and the ring gear 278 on the second side 288 is coupled to a second output shaft 282. In any event, the one or more output shafts may be coupled, either directly or indirectly, to the transmission output 284.

When steering the vehicle or machine and operating the transmission system 200 in range (e.g., in a forward or reverse direction), torque is transferred through the HSU 240. However, the HSU 240 incurs losses when torque passes therethrough. The same is true with the torque converter 208. These losses reduce the overall efficiency of the transmission system 200. When an operator wants to pivot the vehicle or machine, e.g., to make a 90° turn, it is desirable to reduce the losses of the torque converter 208 and HSU 240 and directly connect engine or input power to the steer drive geartrain 254. In addition, it is desirable to pivot the vehicle or machine without overheating the transmission system 200. To achieve high efficiency and avoid overheating the transmission system 200 during a pivot operation, it is desirable to provide a high efficiency pivot steer system. This may be achieved in at least one embodiment by disconnecting the HSU 240 and engaging lockup clutch 210.

Figure 3:
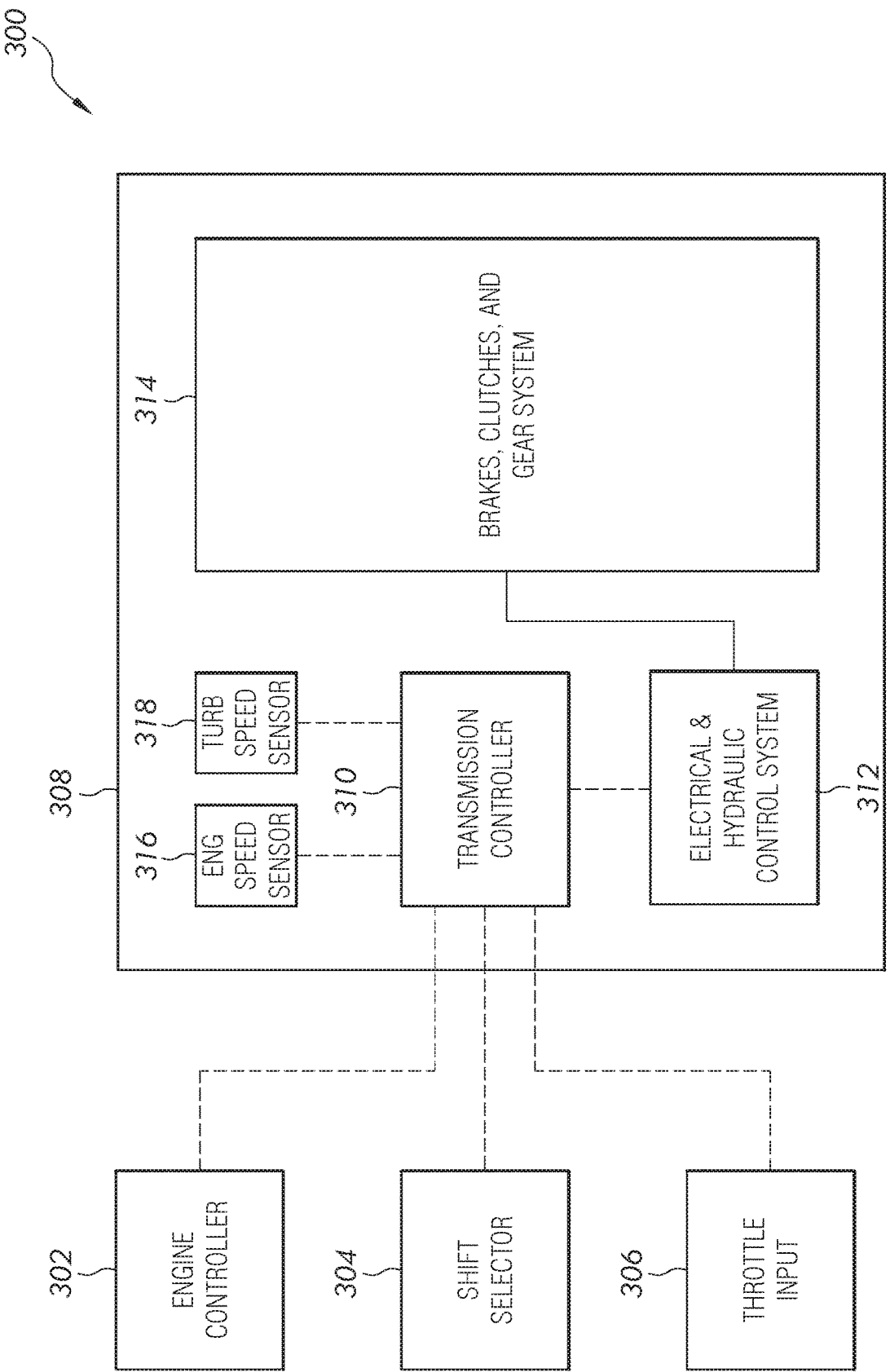
FIG. 3 is a diagram of a controls system of the transmission system of FIG. 2.

Referring to FIG. 3, a vehicular controls system 300 is shown in FIG. 3. In this system 300, a vehicle or machine may include an engine or prime mover (not shown) that is operably controlled by an engine controller 302. An operator can selectively control the vehicle or machine by a shift selector 304 and a throttle input 306. The throttle input 306 may be a sensor that detects when an operator depresses an accelerator or throttle pedal. The sensor may communicate an electrical signal indicative of the amount of throttle desired by the operator. Other control mechanisms may be used by an operator to indicate a desired throttle input.

Moreover, other control mechanisms including a brake system, steering system, and the like may further be included in the controls system 300.

As previously described, the shift selector 304 may be controlled by the operator to control both steering and direction of travel of the vehicle or machine. The shift selector 304 may include a plurality of positions such as forward, reverse, neutral and pivot. Other positions may include park, high, low, etc. The shift selector 304 may include a sensor that detects movement of the shift selector to each of its plurality of positions.

The vehicular controls system 300 further includes a transmission system 308, which may be similar to the transmission system 200 of FIG. 2. The transmission system 308 may include a transmission controller 310, a control system 312 such as a valve body with valves, solenoids, and other control elements, and a geartrain 314. The transmission controller 310 may be in electrical communication with the sensors that detect movement or changes to the shift selector 304 and throttle input 306. In FIG. 3, the dashed line represents an electrical connection (wired or wireless) and the solid line represents a hydraulic, mechanical or electro-hydraulic connection. The transmission controller 310 may be in electrical communication with the engine controller 302 for receiving or communicating various commands or instructions. In one example, engine speed may be communicated via the engine controller 302 to the transmission controller 310 over a J-1939 communication link.

The control system 312 of FIG. 3 may include a plurality of electrical and hydraulic control mechanisms such as solenoids, valves, sensors, etc. The control system 312 may be similar to the electro-hydraulic system 138 of FIG. 1. In at least one embodiment, the control system 312 may include a valve body with a plurality of fluid paths defined therein.

Referring to FIG. 3, sensors such as an input or engine speed sensor 316 and a turbine speed sensor 318 may also be included. The engine speed sensor 316 of FIG. 3 may correspond with the speed sensor 206 of FIG. 2, and the turbine speed sensor 318 may correspond with the other speed sensor 238 referenced in FIG. 2. The input speed sensor 316 and turbine speed sensor 318 may be in electrical communication with the transmission controller 310, as shown. Other sensors may be included in the transmission system 308 such as an output speed sensor, input torque sensor, output torque sensor, etc.

The geartrain 314 may include a plurality of friction devices, clutches, brakes, gears, shafts, etc. The plurality of friction devices may include, but are not limited to, one or more conventional brake devices, one or more torque transmitting devices, and the like. Similar to FIG. 1, the operation, i.e., engagement and disengagement, of the plurality of friction devices is controlled by selectively controlling the friction applied by each of the plurality of friction devices, such as by controlling fluid pressure to each of the friction devices. In one example, which is not intended to be limiting in any way, the plurality of friction devices includes a plurality of brake and torque transmitting devices in the form of conventional clutches that may each be controllably engaged and disengaged via fluid pressure supplied by the control system 312.

In a further example, the steer drive geartrain 254 may be part of the geartrain 314. In addition, the bevel gearset 214, the first directional clutch 226, the second directional clutch 228, and the direct drive pivot clutch 246 may be included in the geartrain 314. In a further example, the HSU disconnect mechanism 266 may be included in the geartrain 314. Moreover, the steer planetary gearset 258 and output planetary gearset 272 may be included as part of the geartrain 314. In at least one embodiment, each gear, shaft, clutch, brake, and planetary gearset forms part of the geartrain 314 of FIG. 3.

Figure 2A:
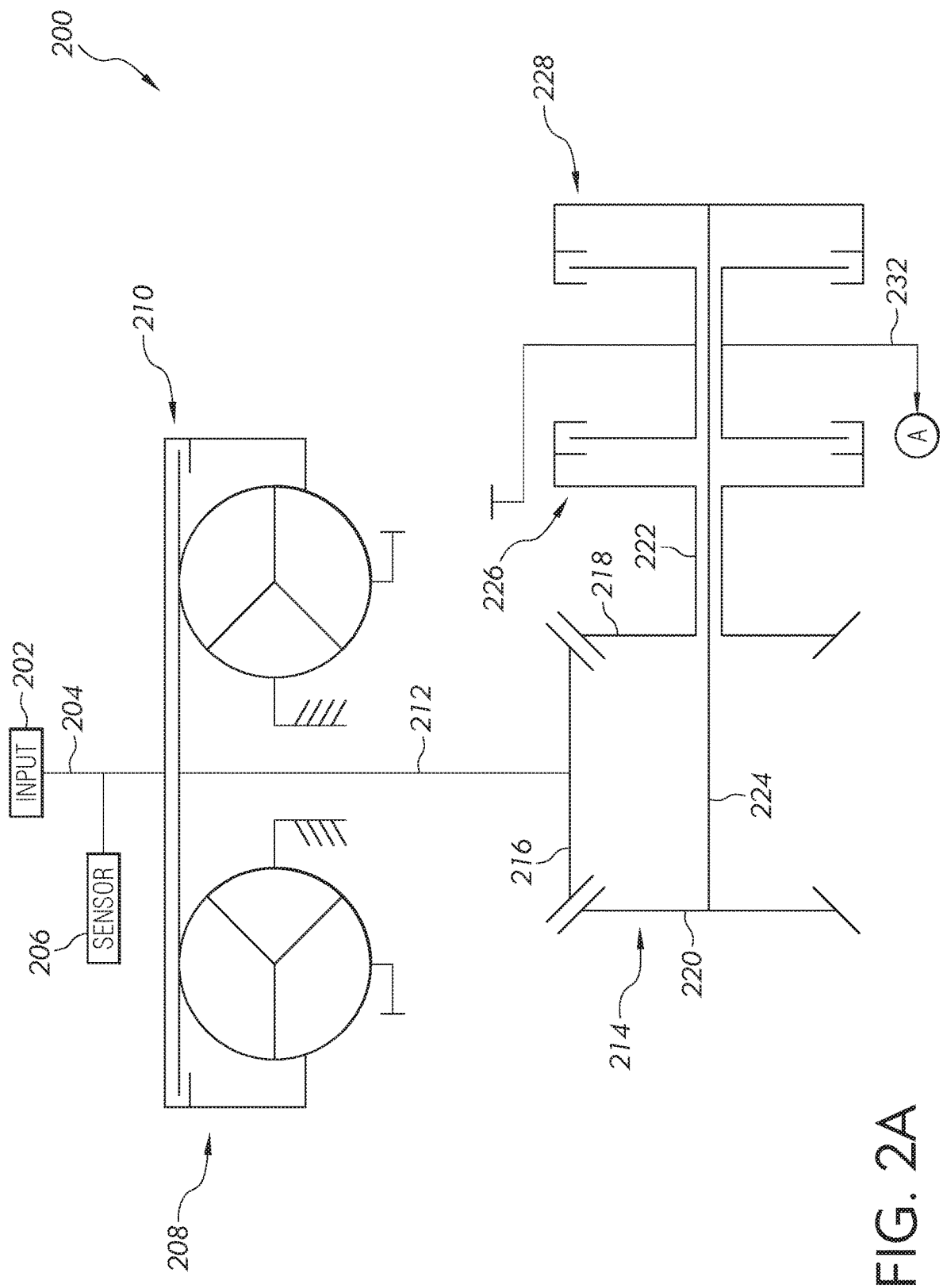
FIG. 2A is a first partial schematic view of a transmission system including a pivot steer system.
Figure 2B:
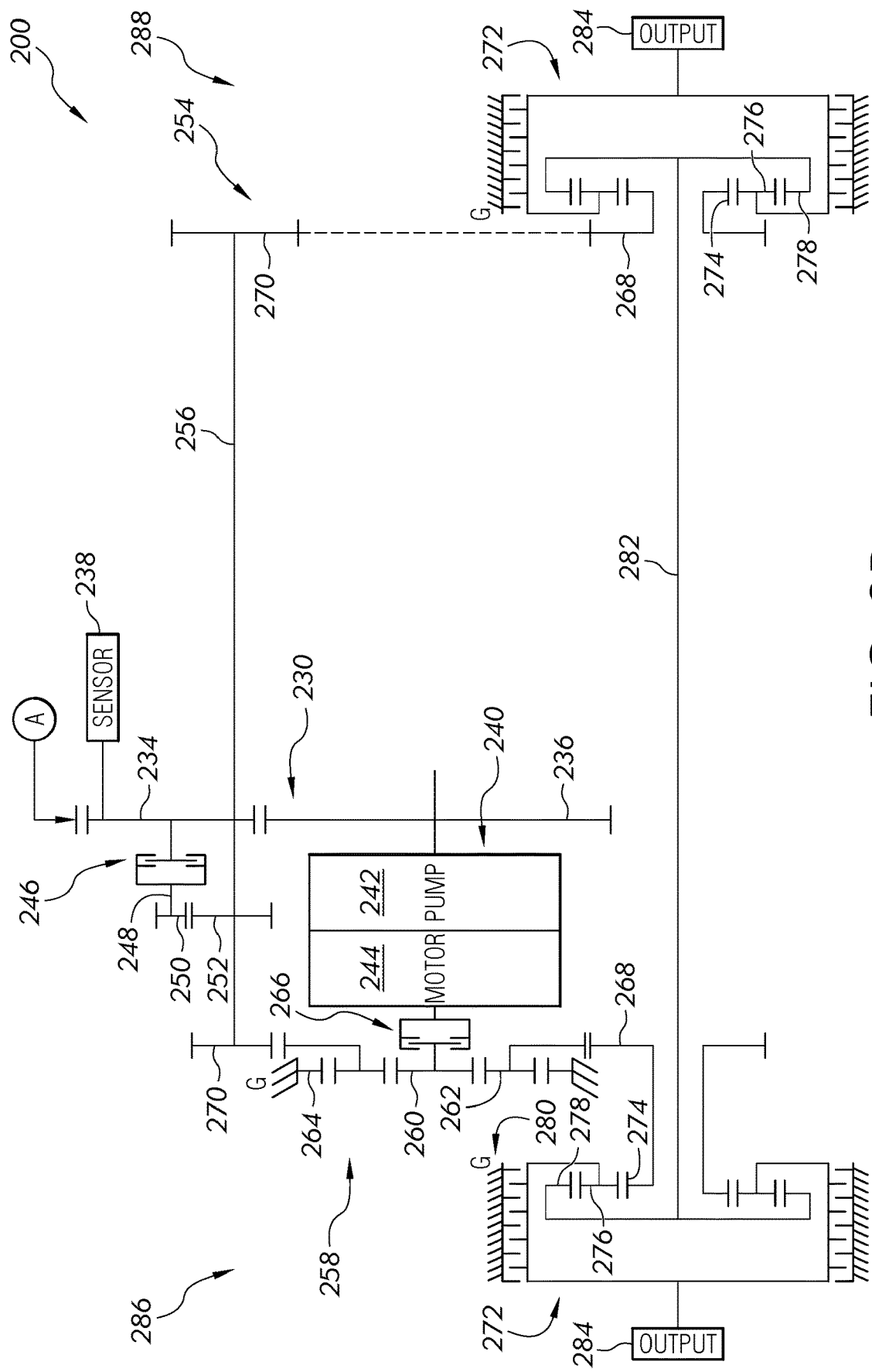
FIG. 2B is a second partial schematic view of the transmission system of FIG. 2A including a pivot steer system.

As previously described, conventional cross-drive transmissions similar to the one depicted in FIGS. 2A-B include completely independent braking and steering systems. In other words, both systems operate independent of the other and there is little to no overlap therebetween. A braking system may include a brake actuator for controllably operating a brake pack on the transmission output. When an operator actuates a brake pedal, for example, the braking system equally applies the brakes on each transmission output.

In convention systems, maintenance procedures have required a vehicle or machine operator or technician to periodically remove access panels on the transmission system to detect brake wear. Adjustments and repairs were then made based on the periodic maintenance schedule. External indicators and the like may be provided for indicating some brake wear, but conventional systems required manual adjustment or replacement of an individual brake pack.

In the present disclosure, however, controls and actuators may be used in combination with a system controller to automatically adjust brake pack clearance, adjust brake actuator position, and detect wear without requiring manual removal of access panels and other structure for periodic maintenance review. Other benefits and improvements will be achieved via the various embodiments described herein.

Figure 4:
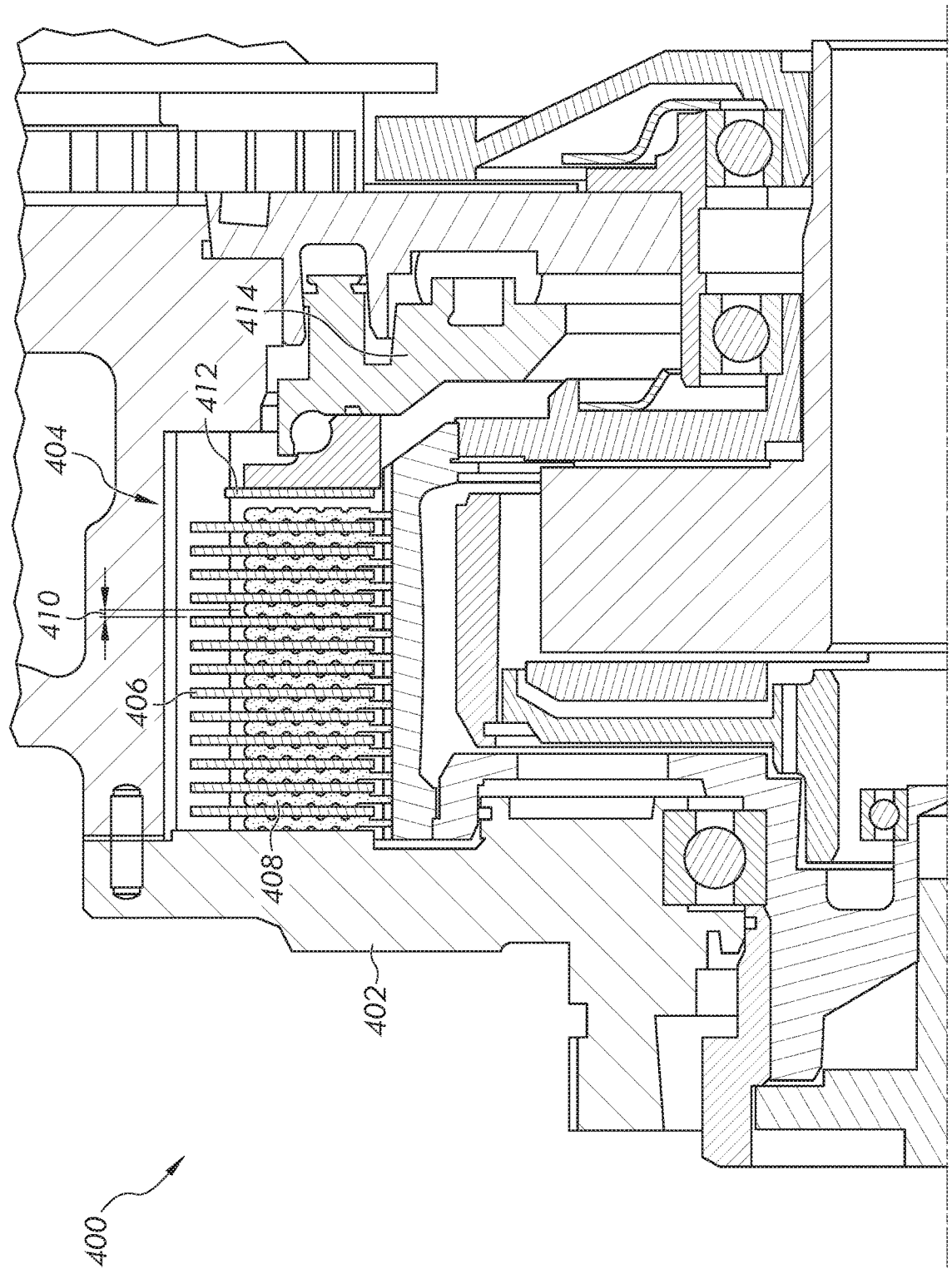
FIG. 4 is a cross-sectional view of a brake clutch pack and a brake actuator of a transmission system.

Referring to FIG. 4, a transmission system 400 is shown with an outer housing 402 that defines an inner cavity. Within the inner cavity is located a brake assembly 404. The brake assembly 404 may form part of the output planetary gearsets 272 described above and shown in FIG. 2B. The brake assembly 404 may act on an output shaft 282 or other member of the transmission system 400. In FIG. 4, the brake assembly 404 may include a plurality of plates that form a brake pack. For example, there may be a plurality of reaction plates 406 and a plurality of friction plates 408. Each of the plurality of friction plates may include a single plate with friction-like material coupled or adhered to one or both sides thereof. One of the plurality of reaction plates may be disposed inbetween adjacent friction plates.

As shown, there may be gap or clearance 410 defined between adjacent plates. The gap or clearance 410 allows oil or other hydraulic fluid, for example, to flow therethrough to cool and lubricate the respective plates. As the plates begin to wear due to repeated application, the clearance 410 may continually increase until the clearance 410 reaches a threshold point. At this point, the clearance 410 may suggest the brake pack needs adjusted or replaced due to wear.

The brake assembly 404 may include an end plate 412 that is in contact at one end of the brake pack. A piston assembly 414 may be actuated by an actuator to move between a first position and a second position. In the first position, the piston assembly 414 may be spaced from and not in contact with the end plate 412. In this first position, the brake pack is not applied. In the second position, however, the actuator may force the piston assembly 414 into contact with the end plate 412 and compress the brake pack together to apply the brakes on a vehicle.

The piston assembly 414 may be actuated by an electro-mechanical actuator, a hydraulic actuator, an electric actuator or any other known type of actuator. Alternatively, hydraulic fluid may flow into a passage on one side of the piston assembly 414 to hydraulically urge it into contact with the end plate 412 to apply the brake pack. Other embodiments may include further known means for applying the brakes.

Figure 5:
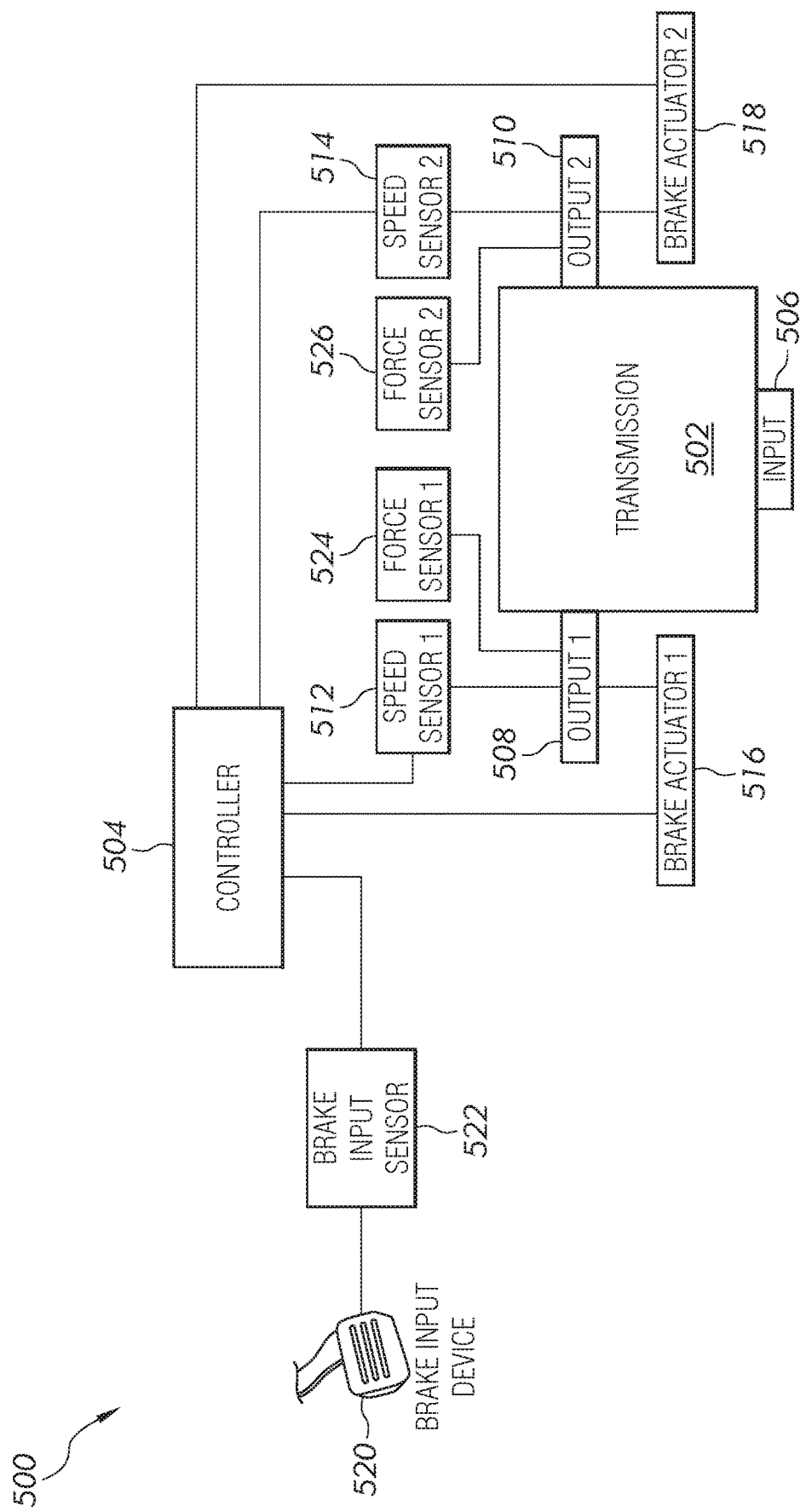
FIG. 5 is a first embodiment of a control system for adjusting brake pack clearance.

Referring to FIG. 5, a control system 500 may include a controller 504 for controlling a cross-drive transmission 502. The controller 504 may include a memory and a processor (not shown). Logic, algorithms, look-up tables, charts, graphs, and other electronic instructions may be stored in the memory of the controller 504 for executing various commands to control the transmission 502, including steering and braking of the vehicle.

The transmission 502 may include a plurality of inputs 506 and at least a first output 508 and a second output 510. The first output 508 may drive a first track on one side of the vehicle, and the second output 510 may drive a second track on an opposite side thereof. Alternatively, the first output 508 and the second output 510 may operably drive an axle of the vehicle. A first speed sensor or sensing device 512 may detect rotational output speed of the first output 508, and a second speed sensor or sensing device 514 may detect rotational output speed of the second output 510. As shown, the first and second speed sensors may be in electrical communication with the controller 504 to communicate the rotational speed of each output to the controller 504.

A first brake actuator 516 may be coupled to the first output 508 of the transmission 502. The first brake actuator 516 may be an electrohydraulic actuator, an electromechanical actuator, an electric actuator, a mechanical actuator, or any other known type of actuator. The first brake actuator 516 may apply brake pressure to a brake pack, such as one of the brake packs 280 shown in FIG. 2. Any type of brake or brake pack may be suitable for this disclosure. As shown in FIG. 5, the first brake actuator 516 may be controlled by the controller 504. The same may be true of a second brake actuator 518 which applies brake pressure to a second brake pack on the second output 510. The second brake actuator 518 may be similar to the first brake actuator 516, but this is not a requirement of this disclosure. The controller 504 may operably send a current to control the first and second brake actuators to operate the braking system of a vehicle.

In addition to the speed sensors, a first force or pressure sensor 524 may be disposed in communication with the first output 508. The first force or pressure sensor 524 may detect an amount of force or pressure applied to the brake or brake pack to slow the first output 508. The first force or pressure sensor 524 may be in electrical communication with the controller 504 so that the controller can operably control the transmission 502 based on the first output 508. Likewise, a second force or pressure sensor 526 may be disposed in communication with the second output 510. The second force or pressure sensor 526 may detect an amount of force or pressures applied to the brake or brake pack to slow the second output 510. The second force or pressure sensor 526 may also be in communication with the controller 504.

The control system 500 further includes a brake input device 520. The brake input device 520 may be a foot pedal, lever, joystick, switch, knob, or other known type of device to request a brake command. A brake input sensor 522 may detect activation or position of the brake input device 520. As such, the brake input sensor 522 can communicate an operator's brake command to the controller 504. The brake input sensor 522 may be a position sensor, a force or pressure sensor, a load cell, or any other type of known sensor. The brake input sensor 522 may also detect a quantity associated with the brake command, i.e., how much force the operator applies to the brake input device 520. For example, if the operator desires to quickly bring the vehicle to a stop, the sensor 522 may detect a response that is different from one in which the operator only wants to slow the vehicle.

The aforementioned brake actuators may be used in conjunction with the controller 504 to detect brake pack clearance. As previously noted, brake pack clearance may have a predefined or set threshold limit that is continuously monitored by the controller 504. In most conventional systems, it is unknown how often or hard the brakes get used by an operator, and thus it is difficult to know when to adjust brake clearance. Brake clearance can be important for maintaining proper heat transfer to protect the brake plates, promote optimal performance, and reduce spin losses. In addition to protecting brake wear, the response time of applying the brakes is often affected by clearance. If the clearance is too large, then it may take longer to apply the brakes. As brake plates are used over time, friction material from the friction plates begins to wear thereby increasing clearance. Moreover, in the embodiment of FIG. 4, the piston assembly 414 may have a limited amount of stroke before it can become misaligned or a seal for maintaining hydraulic pressure may come dislodged from its proper position or orientation. As a result, the present disclosure provides a system and method for maintaining optimal brake pack clearance without requiring operator or manual interference. In doing so, the controller 504 can continuously monitor actuator travel during a brake application and return the actuator to a proper return position in order to achieve desirable clearance. This is further described with reference to FIG. 6.

Figure 6:
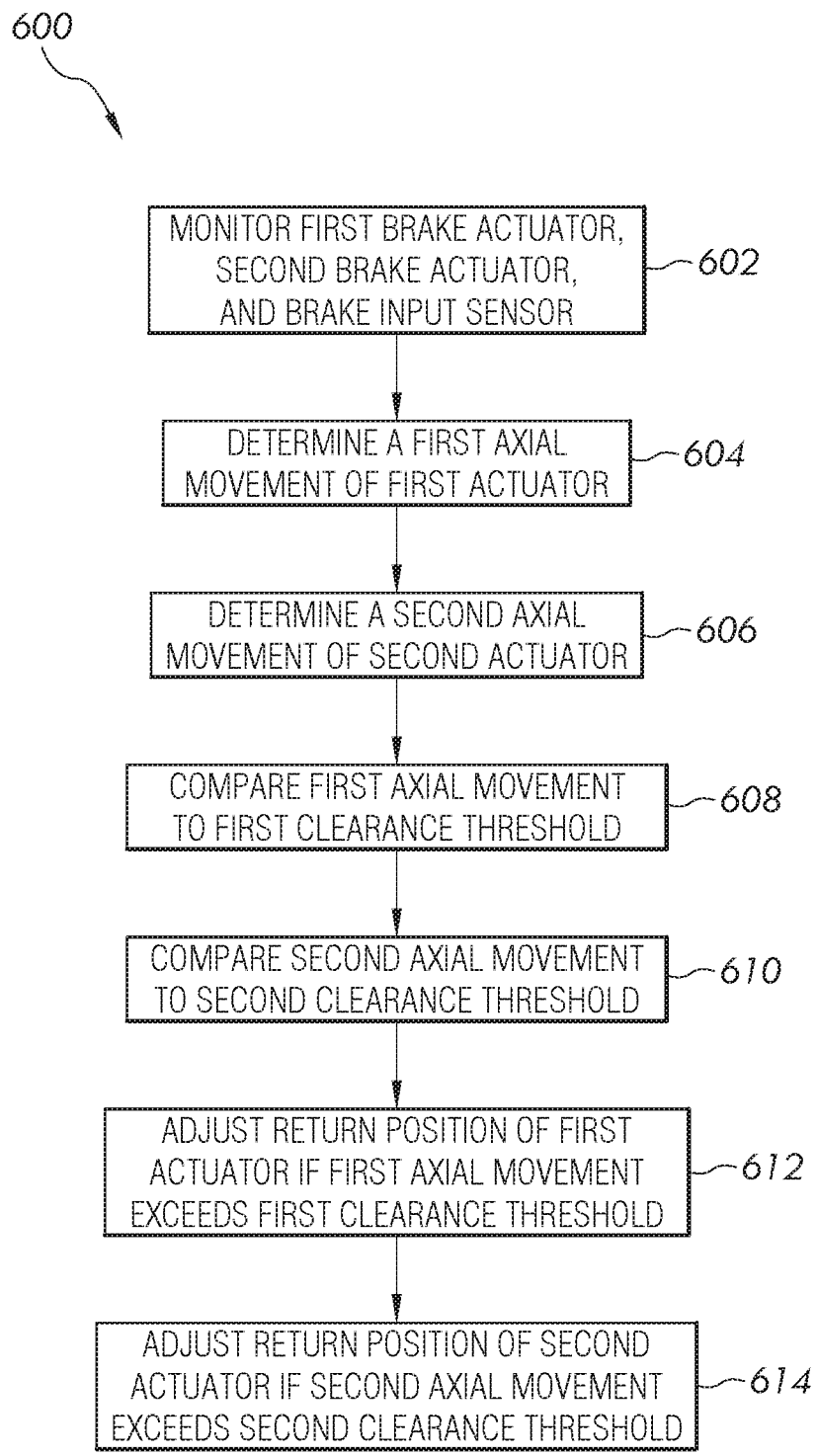
FIG. 6 is a first control process for adjusting brake pack clearance.

Referring to FIG. 6, a control process for maintaining or monitoring brake pack clearance is provided. The control process 600 may include a plurality of steps or blocks executed by the controller 504 or other system component. For instance, in a first block 602 of the control process 600, the controller 504 may be programmed to monitor the first brake actuator 516, the second brake actuator 518 and the brake input device 520. Each may include a sensor, such as the brake input sensor 522, that communicates with the controller 504. Thus, if either actuator moves or the operator requests a brake command via the brake input device 520, the controller 504 may receive the communication and respond accordingly.

During a braking event, the controller 504 may receive a brake command from the operator via the brake input device 520. In blocks 604 and 606, the controller 504 may further monitor axial movement of the first brake actuator 516 and the second brake actuator 518. In doing so, the controller 504 can determine the axial movement of both actuators by detecting or otherwise determining how many revolutions each actuator rotates during its respective movement. In one example, a sensor such as a Hall Effect sensor may be used to detect a number of revolutions of an actuator. The sensor (not shown) may communicate the number of revolutions to the controller 504.

In another example, the controller 504 may be programmed to monitor response time of an actuator to apply the brake. In the embodiment of FIG. 5, for example, the controller 504 may monitor the force or pressure detected by each sensor 524, 526 and the amount of time it takes the actuator to apply the brakes and reach a force or pressure threshold. In this example, the controller 504 may be programmed with a force or pressure threshold, and as the controller 504 sends current to control the actuator it may also monitor how quickly the force or pressure increases on each brake.

The controller 504 may be programmed with a clearance threshold for the brake pack on each output. For example, the controller 504 may store a first clearance threshold for the brake pack on the first output 508 and a second clearance threshold for the brake pack on the second output 510. Once the controller 504 determines the axial movement of the first actuator 516 in block 604 and the axial movement of the second actuator 518 in block 606, the control process 600 may advance to blocks 608 and 610. In block 608, the controller 504 may compare the movement of the first actuator 516 to the first clearance threshold. Similarly, in block 610, the controller 504 may compare the movement of the second actuator 518 to the second clearance threshold.

In block 612, if the movement of the first actuator 516 exceeds the first clearance threshold, the controller 504 may determine that an adjustment is necessary. In other words, the controller 504 may determine that the first actuator 516 travelled too far due to an increased clearance in the brake pack of the first output 508, and thus the clearance needs to be reduced to maintain a desirable response time and adjust for wear in the brake pack. In the event the movement of the first actuator 516 does not exceed the first clearance threshold, the controller 504 may determine that the current brake pack clearance is sufficient to achieve desirable response time when executing a braking operation.

Similarly, in block 614, if the movement of the second actuator 518 exceeds the second clearance threshold, the controller 504 may determine that an adjustment is necessary. In other words, the controller 504 may determine that the second actuator 518 travelled too far due to an increased clearance in the brake pack of the second output 510, and thus the clearance needs to be reduced to maintain a desirable response time and adjust for wear in the brake pack. Moreover, if the movement of the second actuator 518 does not exceed the second clearance threshold, the controller 504 may determine that no adjustment is necessary at the present time.

If, in blocks 612 and 614, the controller 504 determines an adjustment is necessary, the controller 504 may adjust the position of the actuator relative to the brake pack by sending an amount of current to control axial movement of the actuator to a return position. The controller 504 may be programmed or include a lookup table that associates an amount of current relative to axial movement of the actuator. With a new brake pack, for example, the controller 504 may send a first amount of current to control the actuator to move a first amount of axial distance to fully apply the brake. As the brake pack wears, the controller 504 may continue to send the first amount of current to the actuator to achieve the same amount of axial movement, but the controller 504 receives feedback from the first force or pressure sensor 524 and the second force or pressure sensor 526. The controller 504 may determine that the same amount of axial movement is producing less force or pressure against the brake pack. As such, the controller 504 may determine that the brake clearance is changing and an adjustment is necessary to achieve a desirable brake apply, i.e., the force or pressure satisfies a given threshold.

The controller 504 may also or alternatively be programmed to associate current with brake force. As the brake clearance changes, the force response may decrease thus necessitating an adjustment. The controller 504 may adjust the return position of the actuator to achieve a desired brake force. Alternately, the controller 504 may send a different amount of current to achieve the desired brake force. Since power is proportional to voltage and current, and actuator speed is proportional to voltage, the controller can monitor current which is proportional to brake force. For example, an increase in the amount of current sent by the controller 504 to the actuator may result in additional brake force.

The controller 504 may also have a limit to the amount of current it may send to the actuator. Once the current limit is reached, the controller 504 may need to adjust the position of the actuator relative to the brake pack or it may be necessary to replace the brake pack. In any event, the controller 504 can modulate current to generate the necessary brake force during a braking event.

In another example, the brake input sensor 522 can detect the amount of force applied by the operator to the brake input device 520. The amount of force applied by the operator may be equivalent to the amount of brake force needed to achieve the desired operator response. A lookup table, calculations or other means may be provided such that the controller 504 may send an equivalent amount of current to the first brake actuator 516 and the second brake actuator 518 based on the amount of force detected by the brake input sensor 522. In one non-limiting example, the controller 504 may receive a brake command from the brake input device 520 indicating that the operator desires a significant amount of brake force to stop the vehicle. The controller 504 may utilize a lookup table to correlate the amount of brake force to current, and thereby send the amount of current to the actuator. In one such example, this may be approximately 50 amps. In another non-limiting example, the controller 504 may receive a different brake command from the brake input device 520 indicating that the operator only desires to slow the vehicle but not stop it. In this example, the controller 504 may again utilize the lookup table and determine only 20 amps is necessary to achieve the desired braking. The aforementioned examples of 20 and 50 amps respectively are only intended as examples and do not serve to limit the present disclosure. One skilled in the art would appreciate that any difference in current may produce different brake forces.

In addition to brake clearance, the controller 504 may also continuously monitor how the actuator is being repositioned. For example, as the actuator is repositioned to adjust for a change in brake pack clearance, the controller 504 may be programmed with a position threshold. As the actuator is repositioned, the location or position of the actuator may be compared with the position threshold. The position threshold may be set to prevent the actuator, piston, seal or other structure from becoming misaligned or dislodged from its proper position within the transmission 502. As the actuator return or start position approaches the position threshold, the controller 504 may alert the vehicle operator of this condition. Alternatively, the controller 504 may be programmed such that it does not reposition or adjust the actuator as the position threshold is reached.

Figure 7:
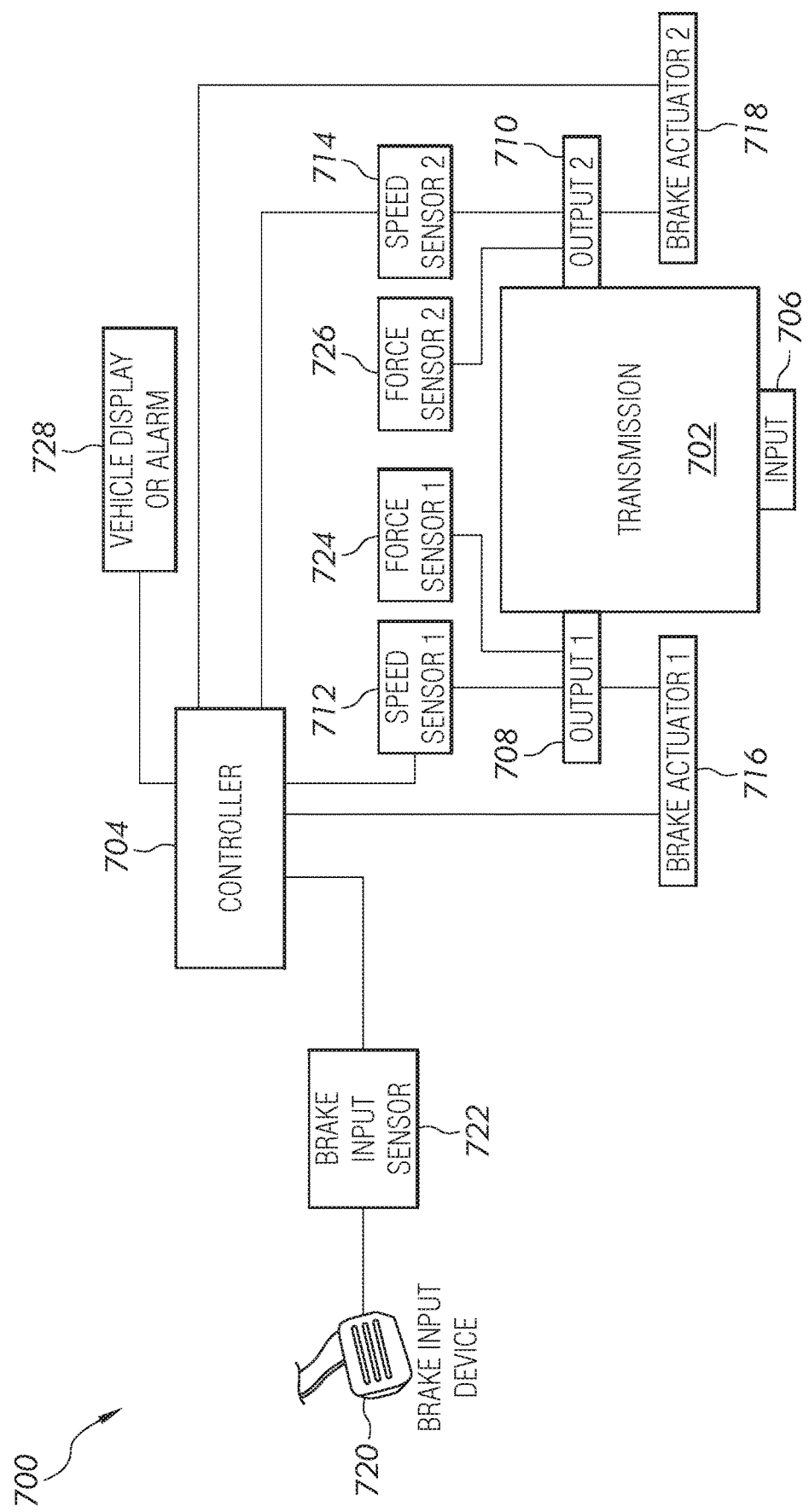
FIG. 7 is a second embodiment of a control system for monitoring wear of a brake pack.

In a different embodiment illustrated in FIG. 7, a control system 700 may include a controller 704 for controlling a cross-drive transmission 702. The controller 704 may include a memory and a processor (not shown). Logic, algorithms, look-up tables, charts, graphs, and other electronic instructions may be stored in the memory of the controller 704 for executing various commands to control the transmission 702, including steering and braking of the vehicle.

The transmission 702 may include a plurality of inputs 706 and at least a first output 708 and a second output 710. The first output 708 may drive a first track on one side of the vehicle, and the second output 710 may drive a second track on an opposite side thereof. Alternatively, the first output 708 and the second output 710 may operably drive an axle of the vehicle. A first speed sensor or sensing device 712 may detect rotational output speed of the first output 708, and a second speed sensor or sensing device 714 may detect rotational output speed of the second output 710. As shown, the first and second speed sensors may be in electrical communication with the controller 704 to communicate the rotational speed of each output to the controller 704.

A first brake actuator 716 may be coupled to the first output 708 of the transmission 702. The first brake actuator 716 may be an electrohydraulic actuator, an electromechanical actuator, an electric actuator, a mechanical actuator, or any other known type of actuator. The first brake actuator 716 may apply brake pressure to a brake pack, such as one of the brake packs 280 shown in FIG. 2. Any type of brake or brake pack may be suitable for this disclosure. As shown in FIG. 7, the first brake actuator 716 may be controlled by the controller 704. The same may be true of a second brake actuator 718 which applies brake pressure to a second brake pack on the second output 710. The second brake actuator 718 may be similar to the first brake actuator 716, but this is not a requirement of this disclosure. The controller 704 may operably send a current to control the first and second brake actuators to operate the braking system of a vehicle.

In addition to the speed sensors, a first force or pressure sensor 724 may be disposed in communication with the first output 708. The first force or pressure sensor 724 may detect an amount of force or pressure applied to the brake or brake pack to slow the first output 708. The first force or pressure sensor 724 may be in electrical communication with the controller 704 so that the controller can operably control the transmission 702 based on the first output 708. Likewise, a second force or pressure sensor 726 may be disposed in communication with the second output 710. The second force or pressure sensor 726 may detect an amount of force or pressures applied to the brake or brake pack to slow the second output 710. The second force or pressure sensor 726 may also be in communication with the controller 704.

The control system 700 further includes a brake input device 720. The brake input device 720 may be a foot pedal, lever, joystick, switch, knob, or other known type of device to request a brake command. A brake input sensor 722 may detect activation or position of the brake input device 720. As such, the brake input sensor 722 can communicate an operator's brake command to the controller 704. The brake input sensor 722 may be a position sensor, a force or pressure sensor, a load cell, or any other type of known sensor. The brake input sensor 722 may also detect a quantity associated with the brake command, i.e., how much force the operator applies to the brake input device 720. For example, if the operator desires to quickly bring the vehicle to a stop, the sensor 722 may detect a response that is different from one in which the operator only wants to slow the vehicle.

Figure 8:
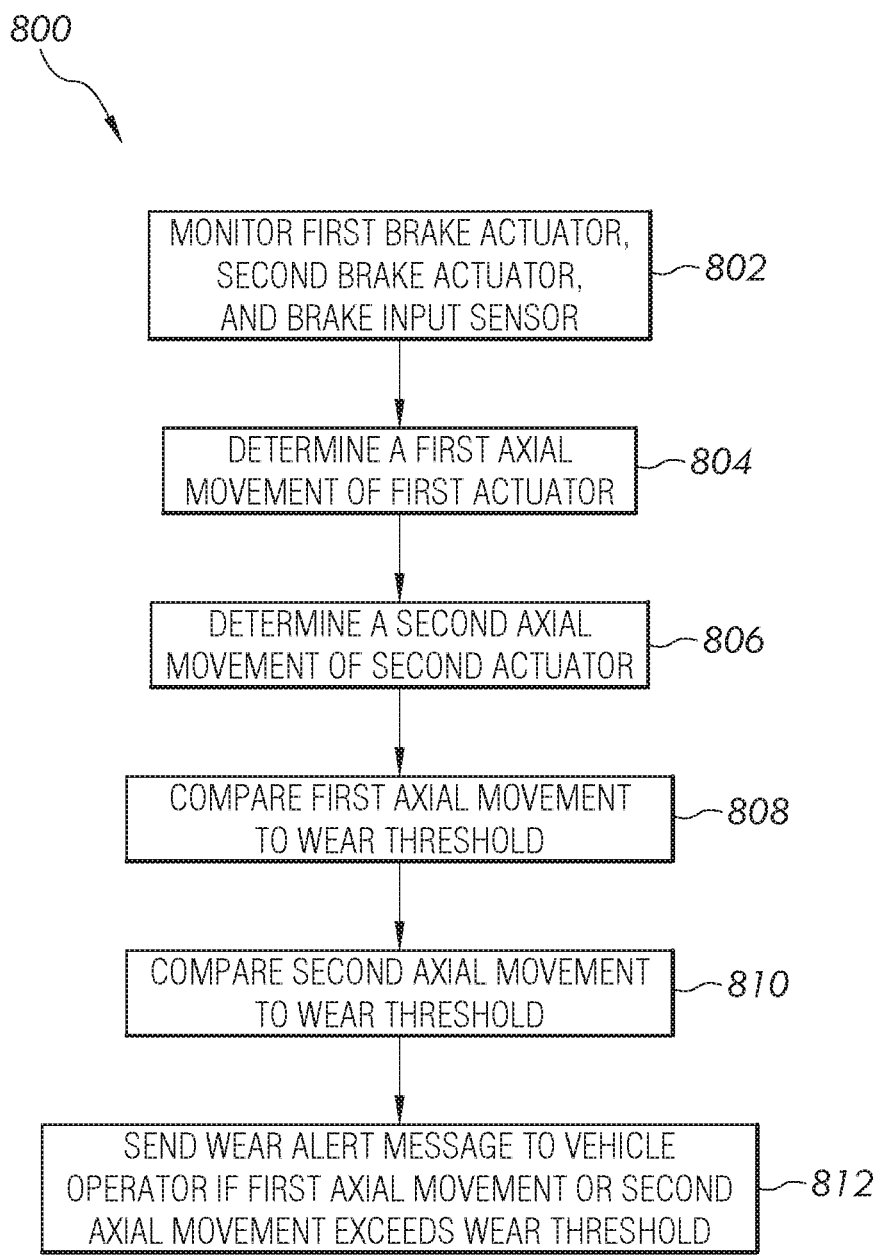
FIG. 8 is a second control process for monitoring wear of a brake pack.

Referring to FIG. 8, a different control process 800 is illustrated. Here, the control process 800 may be executed to monitor brake wear. As brake plates wear with repeated applications, the controller 704 may execute the control process 800 to monitor actuator travel and compare the travel to a set travel limit. Through repeated applications, the brake plates will lose material or wear to a point where the brake pack may need replaced or at least repaired. When a wear limit is reached, the controller 704 may notify or alert the vehicle operator of this condition via a vehicle display 728, screen, monitor, dashboard, audible alert system, or other known means.

To execute this control process 800, the controller 704 may execute a plurality of steps or blocks. In block 802, for example, the controller 704 may be programmed to monitor the first brake actuator 716, the second brake actuator 718 and the brake input device 720. Each may include a sensor, such as the brake input sensor 722, that communicates with the controller 704. Thus, if either actuator moves or the operator requests a brake command via the brake input device 720, the controller 704 may receive the communication and act accordingly.

During a braking event, the controller 704 may receive a brake command from the operator via the brake input device 720. In blocks 804 and 806, the controller 704 may further monitor axial movement of the first brake actuator 716 and the second brake actuator 718. In doing so, the controller 704 can determine the axial movement of both actuators by detecting or otherwise determining how many revolutions each actuator rotates during its respective movement. In one example, a sensor such as a Hall Effect sensor may be used to detect a number of revolutions turned by an actuator. The sensor (not shown) may communicate the number of revolutions to the controller 704.

In block 808, the controller 704 may compare the first axial movement of the first actuator 716 to a wear threshold. The wear threshold may be a distance in which the actuator travels to fully apply the brake. Similar to the embodiment of FIG. 5, the controller 704 may receive feedback from a force or pressure sensor to determine when the brake is fully applied. If the actuator travel exceeds the wear threshold, the controller 704 may communicate this to the operator in block 812 by sending a warning or alert to a vehicle display or dashboard 728 in the vehicle that the brake pack has reached its wear limit. The same may be true in block 810 in which the controller 704 compares the second axial movement of the second actuator 718 to the wear threshold. If the movement exceeds the wear threshold, the controller 704 may communicate this to the operator in block 812. In at least one embodiment, the brake packs on each output may be different, and the wear thresholds may differ for each brake pack. Alternatively, however, the brake packs may be substantially the same and the wear thresholds may be the same.

In another embodiment, the controller 704 may be programmed to monitor brake apply force. During a braking event, the controller 704 may monitor brake apply force, and if there is an inability to hold or maintain a certain brake force during the braking event, the controller 704 may alert the operator of the condition via the vehicle display or dashboard 728. The controller 704 may diagnose this as a need to reposition or adjust the actuator, or it may determine that the material has worn sufficiently from one or more of the brake plates such that a new brake pack is necessary. The controller 704 may perform other diagnostics on the brake pack to detect brake wear.

Although not shown, the first brake actuator 716 and the second brake actuator 718 may be electrically driven by a motor. The controller 704 may send current to drive the motor, which in turn rotates the actuators in either a clockwise or counterclockwise direction. By driving the actuators in one direction, the actuators can move in an axial direction towards the brake pack to urge a piston or other device to apply the brake. The motor may reverse the rotational direction of the actuators to drive the actuators in a direction away from the brake pack. The controller 704 may perform a system initialization check to determine a position of the actuators relative to a start or beginning position. Thus, if power is lost, the controller 704 may be able to determine the position of each actuator relative to its start or beginning position when power is restored. As such, brake wear and clearance may be monitored continuously without the controller 704 being unable to determine the location or position of each actuator.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of controlling brake clearance of a braking system of a vehicle, comprising:
   providing a brake actuator, a brake input device, and a cross-drive transmission including an output and a brake pack;
   receiving a brake command from the brake input device to execute a braking operation, wherein the brake command is based on an amount of brake force applied to the brake input device by an operator to achieve a desired brake force;
   actuating the brake actuator in response to the brake command to apply the brake pack for reducing a speed of the output;
   moving the brake actuator from a first position to a second position during the actuating step, where the first position corresponds to an unapply position in which the brake pack is not applied and the second position corresponds to an apply position in which the brake pack is applied;
   detecting an axial movement of the brake actuator during movement of the brake actuator from the first position to the second position during the moving step;
   comparing the axial movement to a clearance threshold;
   adjusting a return position of the brake actuator that is offset from the first position when the axial movement exceeds the clearance threshold, wherein the return position is based on the desired brake force;
   controlling movement of the brake actuator from the second position to the return position upon completion of the braking operation;
   sensing the amount of brake force applied to the brake input device;
   determining an equivalent brake force current based on the sensed amount of brake force; and
   not adjusting the return position of the brake actuator when the axial movement does not exceed the clearance threshold and sending a desired brake force current to the brake actuator during execution of the braking operation, wherein the desired brake force current is different from the equivalent brake force current to achieve the desired brake force when the axial movement from the first position to the second position changes but does not exceed the clearance threshold.

2. The method of claim 1, wherein the detecting step comprises determining a number of revolutions of rotation of the brake actuator when moving from the first position to the second position, wherein rotation of the brake actuator is configured to move the actuator axially.

3. The method of claim 1, further comprising sending the equivalent brake force current to the brake actuator to control its movement from the first position to the second position.

4. The method of claim 1, further comprising sending a first amount of current to the brake actuator to control its movement from the first position to the second position, and sending a second amount of current to the brake actuator to control its movement from the second position to the return position, where the first amount is different from the second amount.

5. The method of claim 1, further comprising moving the brake actuator from the second position to the first position if the axial movement does not exceed the clearance threshold.

6. The method of claim 1, further comprising:
   providing a sensor for detecting movement of the brake actuator relative to its first position; and
   determining an amount of clearance in the brake pack based on the detecting step.

7. The method of claim 1, further comprising:
   detecting an amount of pressure applied by the brake actuator to the brake pack in the second position;
   comparing the amount of pressure to a pressure threshold; and
   adjusting an amount of current sent to the brake actuator when it moves to the second position based on the pressure comparing step.

8. The method of claim 7, wherein the adjusting an amount of current step comprises increasing the amount of current when the amount of pressure is less than the pressure threshold.

9. The method of claim 1, further comprising modulating an amount of current sent to the brake actuator to control an amount of actuator force applied by the brake actuator against the brake pack in the second position.

10. A method of controlling brake clearance of a brake pack of a vehicle, comprising:
    providing a first brake actuator, a second brake actuator, a brake input device, and a cross-drive transmission including a first output and a second output;
    receiving a brake command from the brake input device, wherein the brake command is based on an amount of brake force applied to the brake input device by an operator to achieve a desired brake force;
    applying, in response to the brake command, the first brake actuator to the first output and the second brake actuator to the second output in response to an equivalent brake force current based on the brake command, where the first brake actuator is moved from its start position to a first apply position, and the second actuator is moved from its start position to a second apply position;
    detecting a first axial movement of the first actuator during the applying step;
    detecting a second axial movement of the second actuator during the applying step;
    comparing the first axial movement to a first clearance threshold to determine if the first axial movement exceeds the first clearance threshold and comparing the second axial movement to a second clearance threshold to determine if the second axial movement exceeds the second axial movement;
    adjusting the position of the first brake actuator if the first axial movement exceeds the first clearance threshold and adjusting the position of the second brake actuator if the second axial movement exceeds the second clearance threshold relative to their respective start positions based on a result of the comparing step, wherein the adjusted position is based on the desired brake force;

not adjusting the position of the first brake actuator if the first axial movement does not exceed the first clearance threshold and sending a first desired brake force current to the first brake actuator, wherein the desired brake force current is different than the equivalent brake force current to achieve the desired brake force when the first axial movement changes but does not exceed the first clearance threshold; and not adjusting the position of the second brake actuator if the second axial movement does not exceed the second clearance threshold and sending a second desired brake force current to the second brake actuator, wherein the second desired brake force current is different than the equivalent brake force current to achieve the desired brake force when the second axial movement changes but does not exceed the second clearance threshold.

11. The method of claim 10, further comprising sending a first amount of current to either the first or second brake actuator to control its axial movement from its respective start position to its respective apply position, and sending a second amount of current to the first or second brake actuator to control its movement from its respective apply position to a return position, where the first amount is different from the second amount.

12. The method of claim 11, further comprising moving either the first or the second brake actuator from the apply position to the start position if the respective axial movement does not exceed the respective clearance threshold.

13. The method of claim 10, further comprising:
modulating an amount of current sent to the first brake actuator to control an amount of actuator force applied by the first brake actuator against the first output; and
modulating an amount of current sent to the second brake actuator to control an amount of actuator force applied by the second brake actuator against the second output.

14. A method of detecting brake wear, comprising:
providing a first brake actuator, a second brake actuator, a brake input device, a brake input sensor to detect a brake apply force, and a cross-drive transmission including a first output having a first brake pack and a second output having a second brake pack;
receiving a brake command from the brake input device, wherein the brake command is based on an amount of brake apply force applied to the brake input device by an operator to achieve a desired brake apply force during a braking event;
controlling, in response to the brake command, the first brake actuator to apply the first brake pack and the second brake actuator to apply the second brake pack, where the first brake actuator is axially controlled from its start position to a first apply position in which the first brake pack is applied, and the second brake actuator is moved from its start position to a second apply position in which the second brake pack is applied;
detecting a first axial movement of the first brake actuator during the controlling step; detecting a second axial movement of the second brake actuator during the controlling step; comparing the first axial movement to a first wear threshold and the second axial movement to a second wear threshold;
sending a threshold alert if the first axial movement exceeds the first wear threshold or the second axial movement exceeds the second wear threshold;
monitoring the brake apply force during the braking event;
sending a brake apply force alert if the monitored brake apply force indicates that there is an inability to hold the brake apply force during a braking event;
sensing a first current based on a first amount of actuator force applied by the first or second brake actuator to its respective brake pack during a first braking operation;
sensing a second current based on a second amount of actuator force applied by the first or second brake actuator to its respective brake pack during a subsequent braking operation;
increasing a distance traveled by the first or second brake actuator during the first or second axial movement if the second current is less than the first current;
not increasing the distance traveled by the first or second brake actuator during the first or second axial movement if the first axial movement does not exceed the first wear threshold or the second axial movement does not exceed the second wear threshold and increasing the first current to achieve the first amount of actuator force or increasing the second current to achieve the second amount of actuator force.

15. The method of claim 14, further comprising:
diagnosing the first brake pack needs replaced when the first axial movement exceeds the first wear threshold; and
diagnosing the second brake pack needs replaced when the second axial movement exceeds the second wear threshold.

16. The method of claim 14, further comprising executing an initialization routine to determine a position of the first and second brake actuators.

17. The method of claim 14, wherein the sending step comprises communicating an audible or visual alert indicative of excessive brake wear.

* * * * *